(12) United States Patent
Marchant

(10) Patent No.: US 10,941,835 B2
(45) Date of Patent: Mar. 9, 2021

(54) ATTACHMENT DEVICE, RETAINER AND ASSOCIATED METHOD OF USE

(71) Applicant: IP & IT PTY LTD, Newcastle (AU)

(72) Inventor: Dallas John Marchant, Newcastle (AU)

(73) Assignee: IP & IT PTY LTD, New South Wales (AU)

( * ) Notice: Subject to any disclaimer, the term of this patent is extended or adjusted under 35 U.S.C. 154(b) by 0 days.

(21) Appl. No.: 16/070,951

(22) PCT Filed: Jan. 18, 2017

(86) PCT No.: PCT/AU2017/050031
§ 371 (c)(1),
(2) Date: Jul. 18, 2018

(87) PCT Pub. No.: WO2017/124141
PCT Pub. Date: Jul. 27, 2017

(65) Prior Publication Data
US 2019/0024754 A1 Jan. 24, 2019

(30) Foreign Application Priority Data

Jan. 22, 2016 (AU) ................................ 2016900202

(51) Int. Cl.
*F16G 11/14* (2006.01)
(52) U.S. Cl.
CPC ........... *F16G 11/14* (2013.01); *Y10T 24/1498* (2015.01)
(58) Field of Classification Search
CPC ........ F16G 11/14; F16G 11/143; Y10T 24/14; Y10T 24/1498; Y10T 24/314
See application file for complete search history.

(56) References Cited

U.S. PATENT DOCUMENTS 5,033,169 A * 7/1991 Bindon .................. F16G 11/00
24/115 H
5,697,128 A * 12/1997 Peregrine ................ F16G 11/14
24/115 G (Continued)

FOREIGN PATENT DOCUMENTS

EP 2101084 9/2009
WO 2015140170 9/2015

OTHER PUBLICATIONS

International Search Report filed in PCT/AU2017/050031 dated Apr. 10, 2017.

*Primary Examiner* — Robert Sandy
*Assistant Examiner* — Michael S Lee
(74) *Attorney, Agent, or Firm* — Rankin, Hill & Clark LLP

(57) ABSTRACT

A device for attachment with a structure such as a rope, bar, cord, pole or the like includes a loop arrangement having a first attachment portion and a second loop portion and a retainer located between the first attachment portion and the second loop portion. The loop arrangement is adapted to be movable between a non-furled condition, in which respective first and second ends of the first attachment portion and the second loop portion are located away from one another, and a furled condition, in which the second loop portion is wrapped around the rope to form a wrapped section with the first attachment portion fitted through the second loop portion and extending laterally of the rope and with the second end of the second loop portion being retained by the retainer thereby maintaining the furled condition. A retainer and an associated method of use is also disclosed.

10 Claims, 8 Drawing Sheets

(56) References Cited

U.S. PATENT DOCUMENTS

| | | | |
|---|---|---|---|
| 5,896,623 A * | 4/1999 | Martin | F16L 3/233 24/115 G |
| 6,393,670 B1 | 5/2002 | Bealmear | |
| 6,543,094 B2 | 4/2003 | D'Addario | |
| 6,842,948 B2 * | 1/2005 | Smith | F16L 3/233 24/16 R |
| 7,076,845 B2 | 7/2006 | Tylaska et al. | |
| 9,179,751 B2 * | 11/2015 | Lei | A45D 8/34 |
| 2003/0005557 A1 * | 1/2003 | Renn | B65D 63/10 24/115 G |
| 2008/0034716 A1 * | 2/2008 | Foster | B68B 1/02 54/85 |
| 2013/0056696 A1 | 3/2013 | Guihard | |
| 2016/0108989 A1 | 4/2016 | Symons | |
| 2017/0108081 A1 * | 4/2017 | Laurant | D07B 1/18 |

* cited by examiner

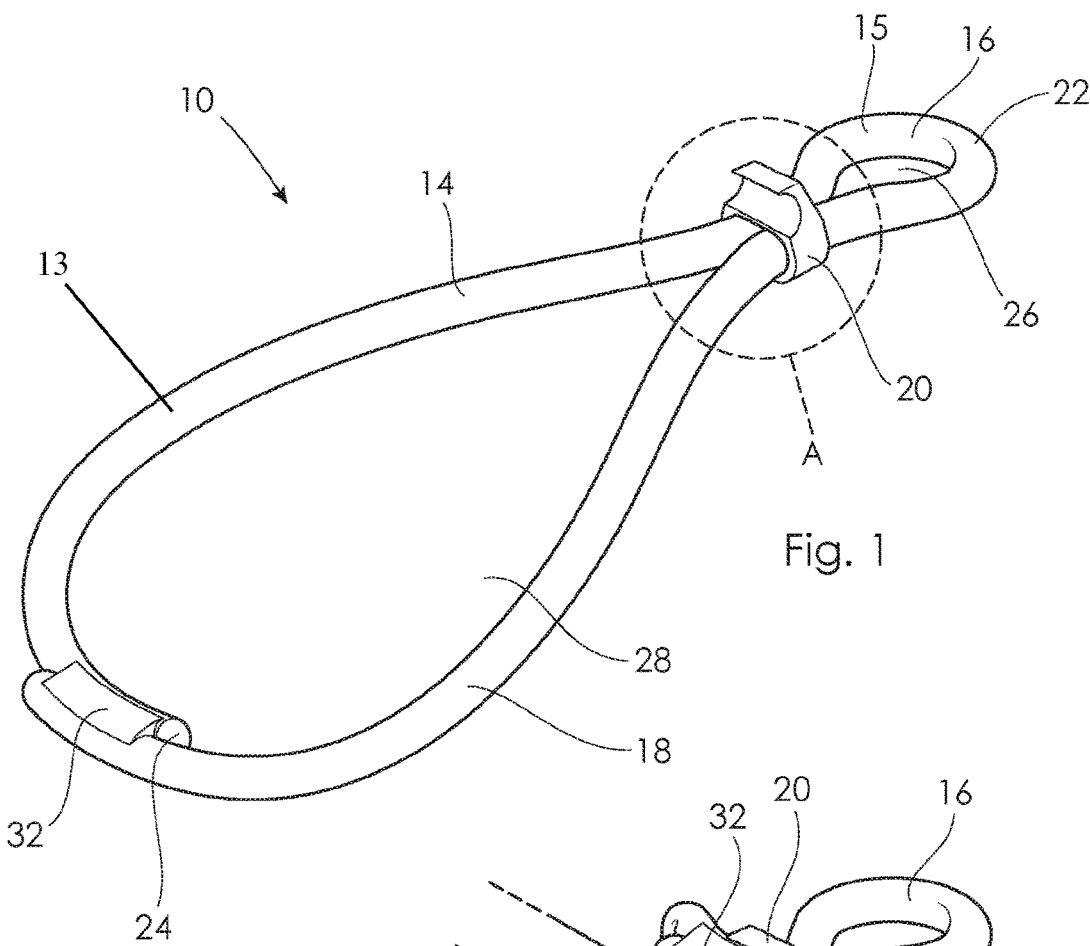
Fig. 1
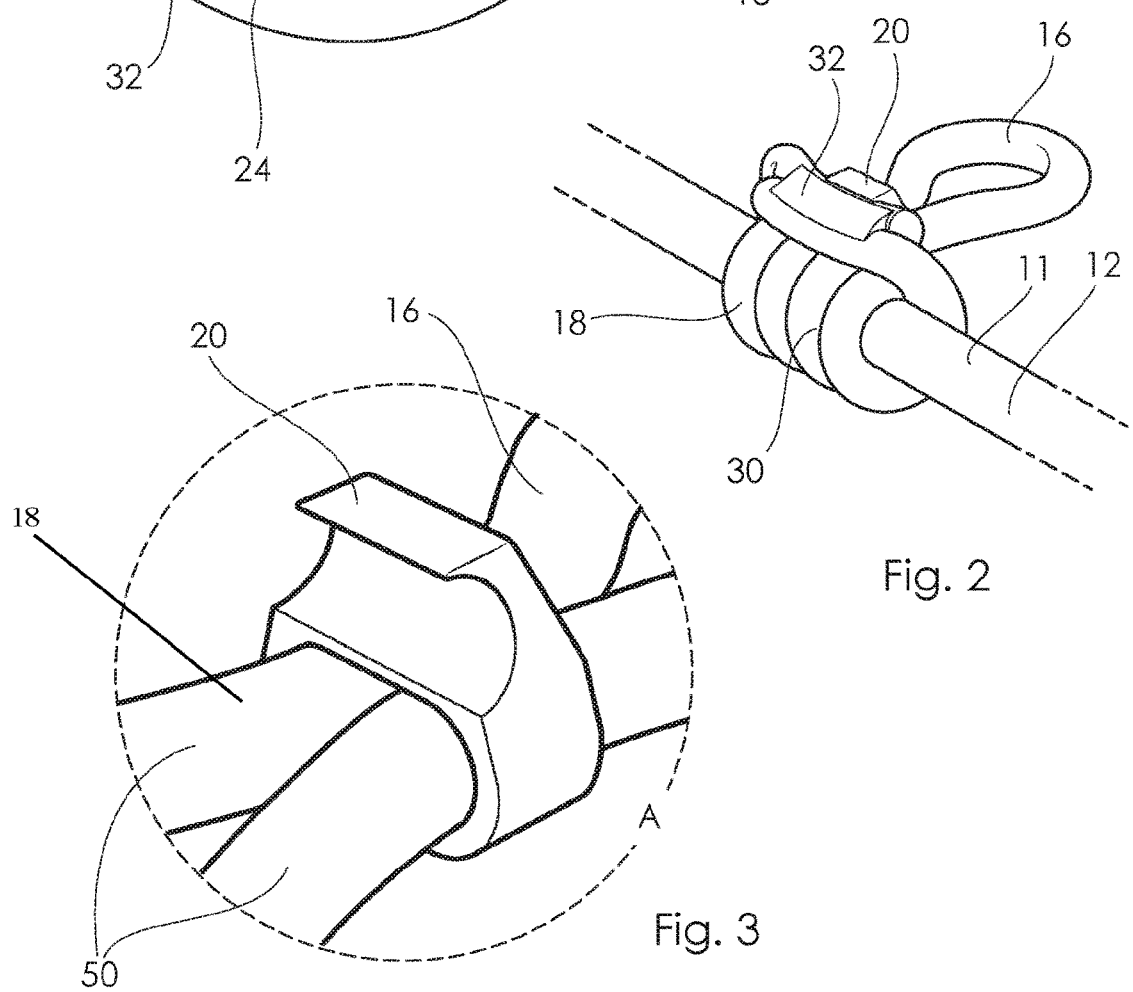
Fig. 2
Fig. 3

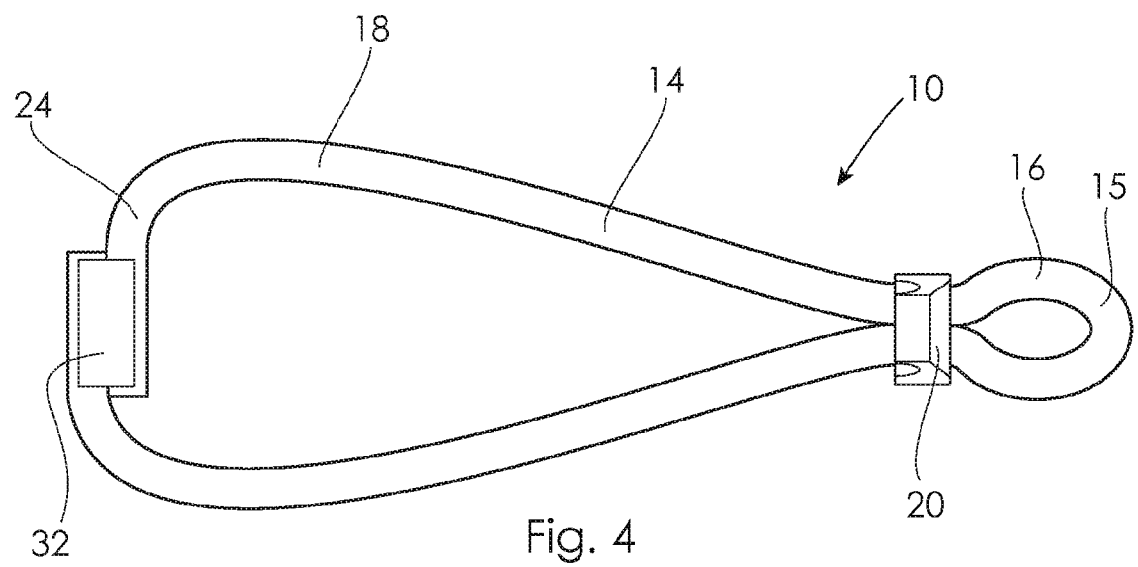
Fig. 4
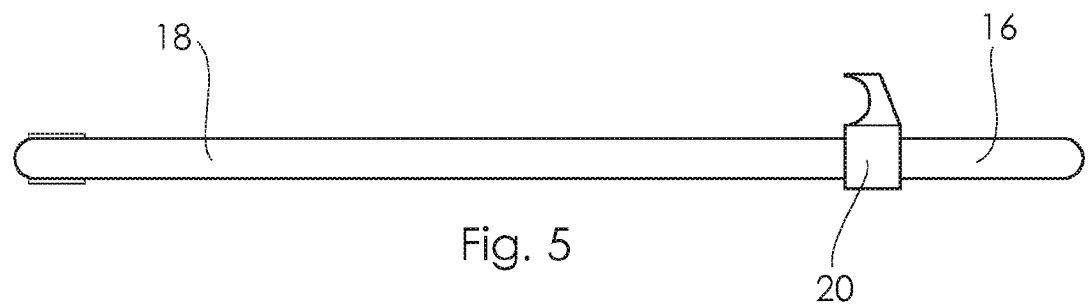
Fig. 5
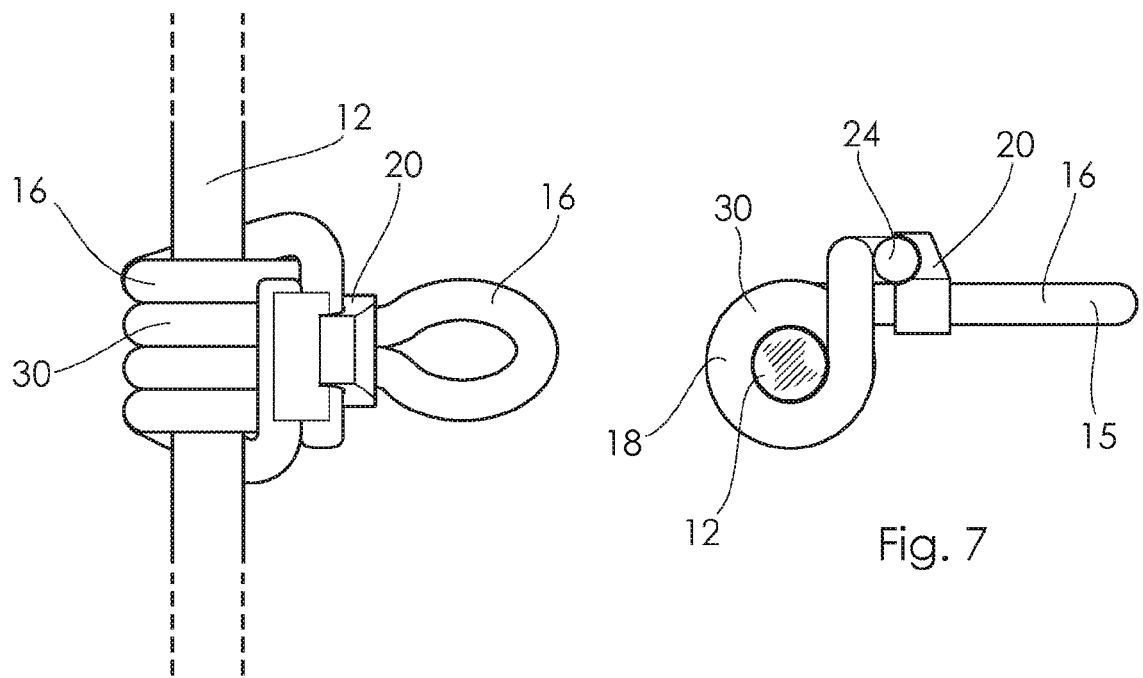
Fig. 6
Fig. 7

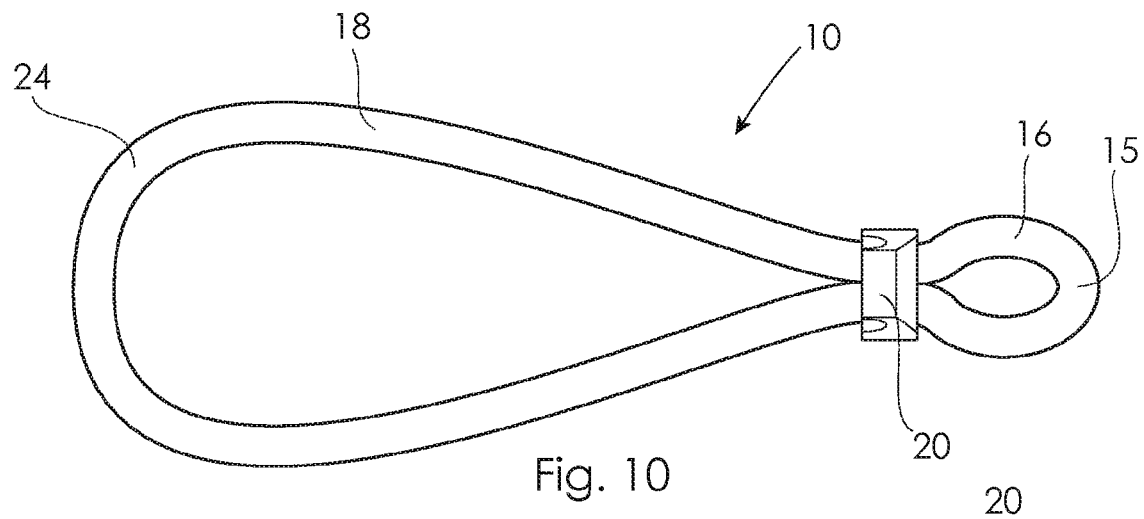
Fig. 10
Fig. 11
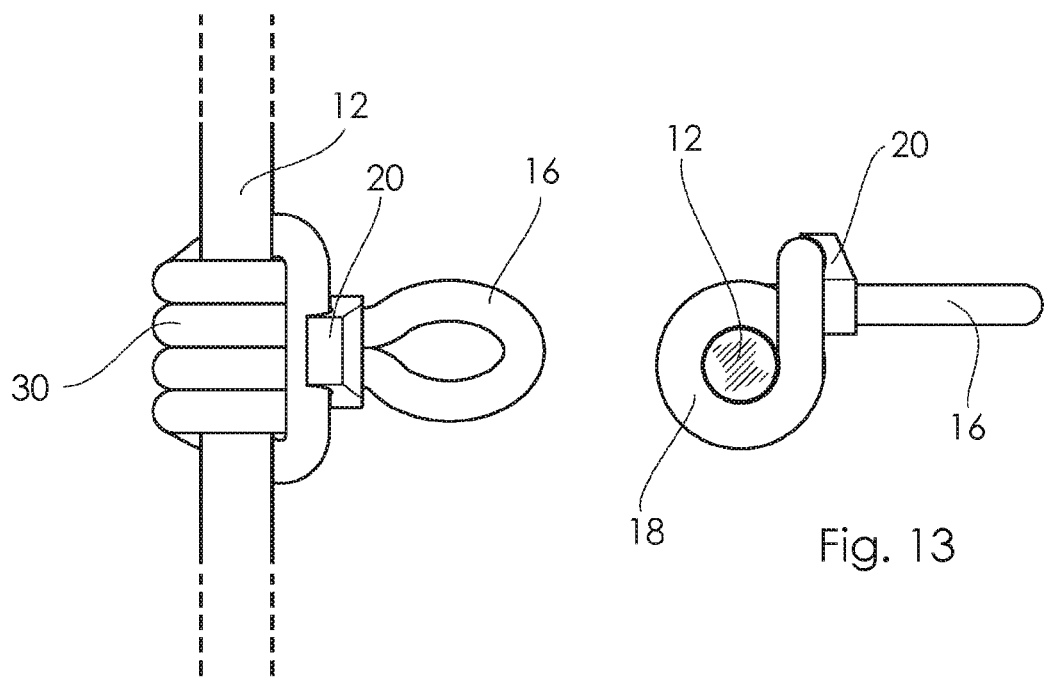
Fig. 12
Fig. 13

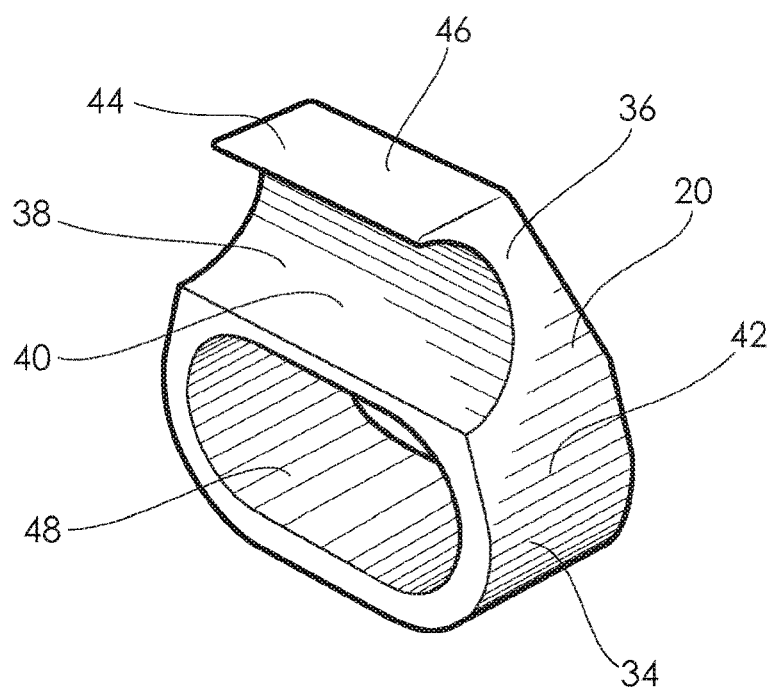
Fig. 14
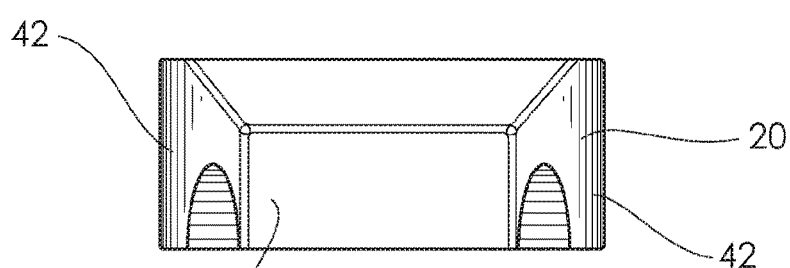
Fig. 15
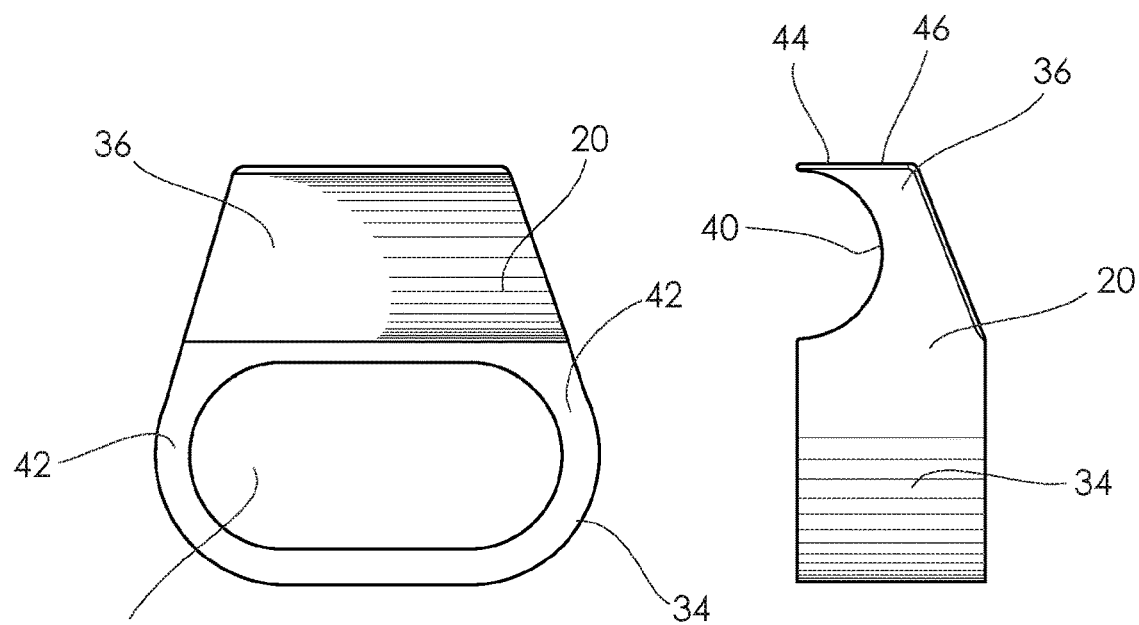
Fig. 16
Fig. 17

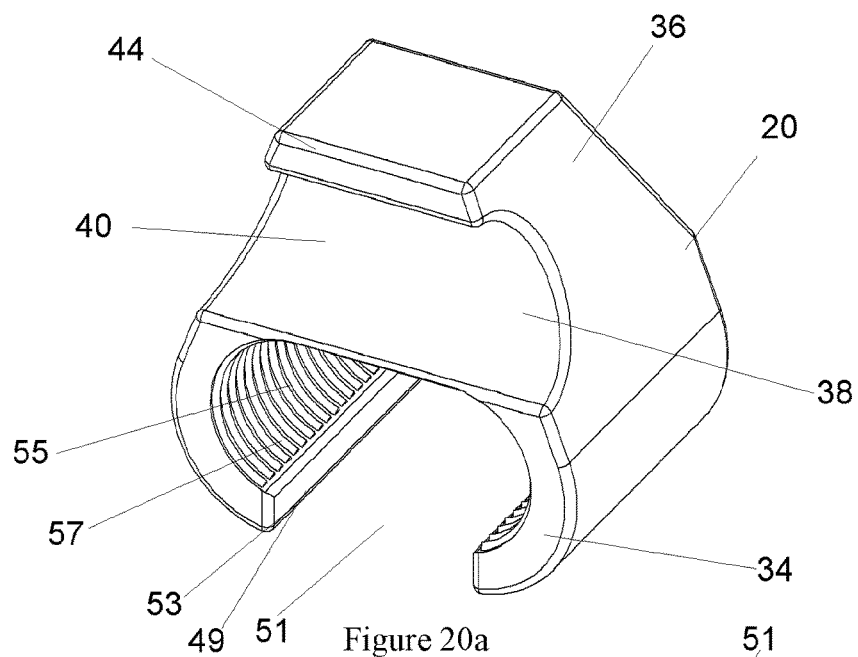
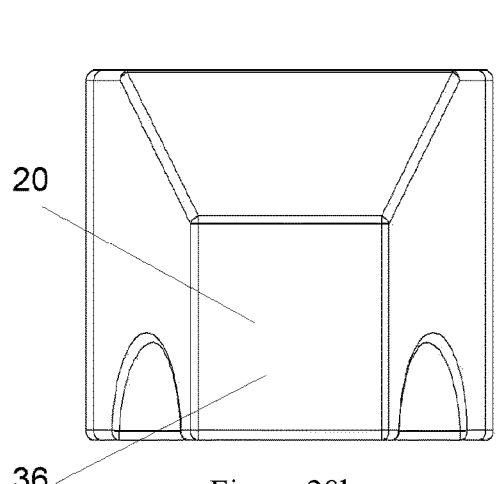
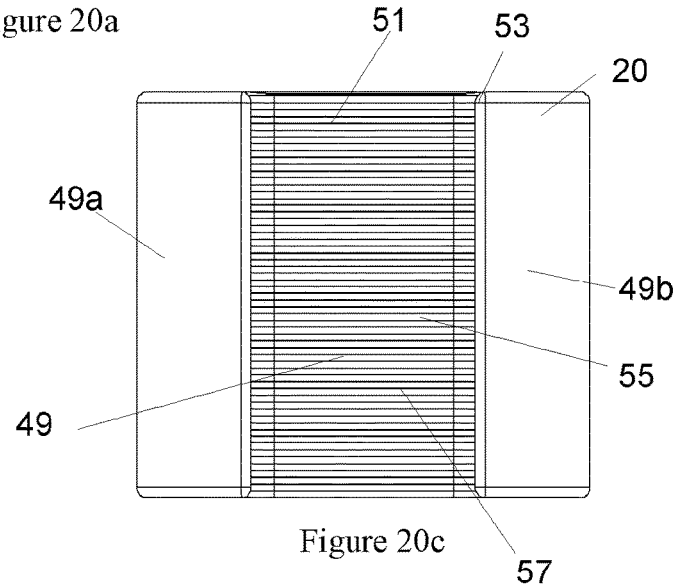
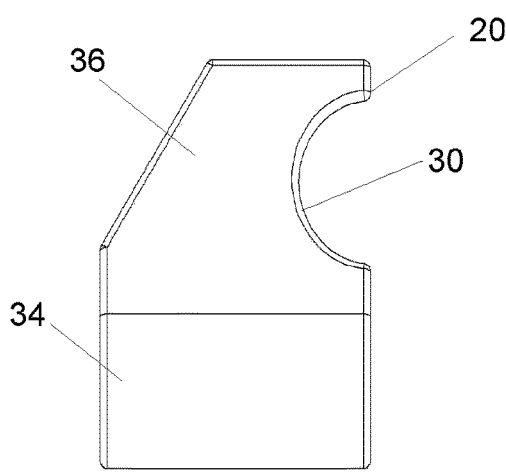
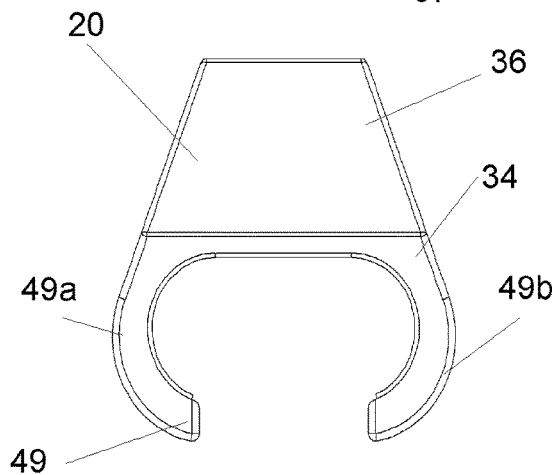
Figure 20a
Figure 20b
Figure 20c
Figure 20d
Figure 20e

ATTACHMENT DEVICE, RETAINER AND ASSOCIATED METHOD OF USE

RELATED APPLICATIONS

This application claims priority from Australia provisional patent application No. 2016900202 filed on 22 Jan. 2016, the contents of which are incorporated herein by reference.

TECHNICAL FIELD

The invention relates to an attachment device for providing an attachment point on a structure such as a rope, pole, bar, cord or the like and an associated method. The invention also relates to a retainer for a loop arrangement to provide such an attachment device as well as an associated method of use.

BACKGROUND

It is often desirable to form an attachment point, such as a loop, on a rope or other structure. Accordingly, a variety of devices and methods including forming complex knots have been proposed.

Once such method of forming an attachment point on a rope or similar structure involves the use of a prusik knot or simply "prusik" that involves forming a sliding "friction" knot on a main rope, structure, pole or the like. The prusik knot involves wrapping a gripping portion of a prusik rope around the main rope with an attachment portion of the prusik rope extending from the wrapped gripping portion. The gripping portion is slidable along the main rope and grips the main rope, via friction, when the attachment portion is tensioned. The attachment portion of the prusik rope may be formed into a loop to provide an attachment point.

A problem with the prusik knot is that it requires a substantial amount of dressing, and associated skill, to properly form the knot such as sizing the knot for a friction fit with a particular diameter of main rope. The prusik knot also often needs to be re-dressed each time it is utilised or if it is moved along the main rope. The prusik knot is also not suitable to be pre-formed and therefore requires time and skill to create the correctly size knot each time the knot is utilised.

The invention disclosed herein seeks to overcome one or more of the above identified problems or at least provide a useful alternative.

SUMMARY

In accordance with a first main aspect there is provided, a device for attachment with a structure such as a rope, bar, cord, pole or the like. The device includes a loop arrangement having a first attachment portion and a second loop portion, and a retainer located between the first attachment portion and the second loop portion, wherein the loop arrangement is adapted to be movable between a non-furled condition, in which respective first and second ends of the first attachment portion and the second loop portion are located away from one another, and a furled condition, in which the second loop portion is wrapped around the rope to form a wrapped section with the first attachment portion fitted through the second loop portion and extending laterally of the rope and with the second end of the second loop portion being retained by the retainer thereby maintaining the furled condition.

In an aspect, the first attachment portion is provided in the form of a first loop portion.

In another aspect, the retainer includes a coupling portion for coupling with the loop arrangement and a retaining portion extending from the loop arrangement.

In yet another aspect, the retaining portion is adapted to at least partially receive the second loop portion in the furled condition.

In yet another aspect, the retaining portion includes a recess arranged to at least partially receive the second loop portion in the furled condition, the recess being oriented away from the first loop portion.

In yet another aspect, the recess is provided in the form of a channel extending between opposing sides of the retaining portion, the channel being shaped to fit with a received second end of the second loop portion.

In yet another aspect, the coupling portion is moveable relative to the loop arrangement, movement of the coupling portion thereby changing the relative sizes of first and second loop portions.

In yet another aspect, the coupling portion is fixed relative to the loop arrangement.

In yet another aspect, the loop arrangement is formed from a resilient material so that the second portion is urged against the retaining portion of the retainer in the furled condition.

In yet another aspect, the loop arrangement is formed from rope.

In yet another aspect, the loop arrangement is formed from rubber.

In yet another aspect, the second loop portion is larger than the first loop portion.

In accordance with a second main aspect there is provided, a prusik including or formed by a device as defined above.

In accordance with a third main aspect there is provided, a method of forming an attachment point for a structure such as a rope using a device having a first attachment portion, a second loop portion and a retainer located between the first attachment portion and second loop portion, the method including the steps of: Positioning, the device in an initially unfurled condition and the first attachment portion on one side of the rope with a retaining portion of the retainer extending away from the side of the rope and the second loop portion extending from a second side of the rope; Furling the second portion around the rope, initially in a direction away from the retaining portion, and passing the first attachment portion through the second loop portion such that the second loop portion forms a wrapped section with the first attachment portion fitted through the second loop portion and extending laterally of the rope; and Fitting a second end of the second loop portion with the retainer thereby securing the device in a furled condition with the first attachment portion providing the attachment point.

In an aspect, the retainer is moveable and wherein the method further includes the step of: Actuating the retainer so as to alter the size of the second loop portion so that the wrapped section is dimensioned to fit with the rope. In yet another aspect the loop arrangement includes visual markings for the positioning of the retainer, the visual markings corresponding to pre-determined diameters of rope, and the method including the step of aligning the retainer with at least one of the visual markings.

In accordance with a fourth main aspect there is provided, a retainer for attaching to a loop arrangement to provide the device as defined above and herein.

In accordance with a fifth main aspect there is provided, a retainer adapted to fit with a loop arrangement in a fitted condition to provide a device for attachment with a structure, the retainer including a coupling portion arranged to receive sections of the loop arrangement so as to couple therewith in the fitted condition and a retaining portion extending from the coupling portion and in a direction away from the received sections of the loop arrangement, wherein in the fitted condition the retainer defines a first loop portion and a second loop portion of the loop arrangement with the retainer located between the first and second loop portions such that the loop arrangement is movable between a non-furled condition, in which respective first and second ends of the first and second loop portions are located away from one another, and a furled condition, in which the second loop portion is wrapped around the structure to form a wrapped section with the first loop portion fitted through the second loop portion and extending laterally of the structure and with the second end of the second loop portion being retained by the retaining portion of retainer thereby maintaining the furled condition.

In an aspect, the retaining portion includes a recess arranged to at least partially receive the second loop portion in the furled condition, the recess being oriented away from the first loop portion.

In another aspect, the recess is provided in the form of a channel extending between opposing sides of the retaining portion, the channel being shaped to fit with a received second end of the second loop portion.

In yet another aspect, the coupling portion is moveable relative to the loop arrangement, movement of the coupling portion thereby changing the relative sizes of first and second loop portions.

In yet another aspect, the coupling portion includes an open channel shaped to fittingly receive opposing sections of the loop arrangement so as to define the first and second loop portions in the fitted condition.

BRIEF DESCRIPTION OF THE FIGURES

The invention is described, by way of non-limiting example only, by reference to the accompanying figures, in which;

FIG. 1 is a perspective view illustrating a first example of an attachment device in an unfurled condition;

FIG. 2 is a perspective view illustrating the attachment device in a furled condition;

FIG. 3 is a detailed perspective view illustrating a retainer of the attachment device as shown in Detail A of FIG. 1;

FIG. 4 is a top view illustrating the attachment device in the unfurled condition;

FIG. 5 is a side view illustrating the attachment device in the unfurled condition;

FIG. 6 is a top view illustrating the attachment device in the furled condition;

FIG. 7 is a side view illustrating the attachment device in the furled condition;

FIG. 10 is a top view illustrating the attachment device in the unfurled condition;

FIG. 11 is a side view illustrating the attachment device in the unfurled condition;

FIG. 12 is a top view illustrating the attachment device in the furled condition;

FIG. 13 is a side view illustrating the attachment device in the furled condition;

FIG. 14 is a perspective illustrating a retainer of the attachment device;

FIG. 15 is a top view illustrating retainer of the attachment device;

FIG. 16 is a front view illustrating retainer of the attachment device;

FIG. 17 is a side view illustrating retainer of the attachment device; and

FIG. 20a is a front perspective view illustrating the second example of the retainer;

FIG. 20b is a top view illustrating the second example of the retainer;

FIG. 20c is a bottom view illustrating the second example of the retainer;

FIG. 20d is a side view illustrating the second example of the retainer; and

FIG. 20e is a front perspective view illustrating the second example of the retainer.

DETAILED DESCRIPTION

Figure 8:
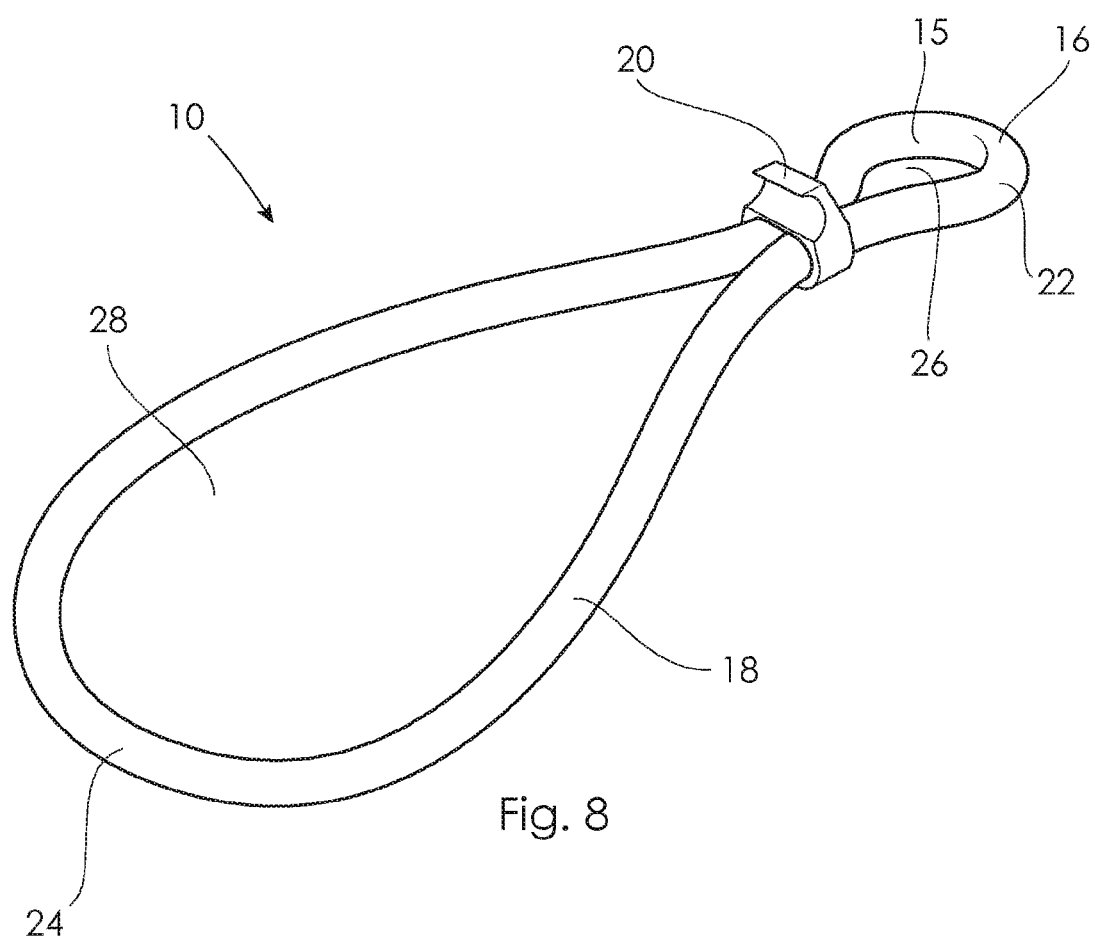
FIG. 8 is a perspective view illustrating a second example of an attachment device in an unfurled condition.
Figure 9:
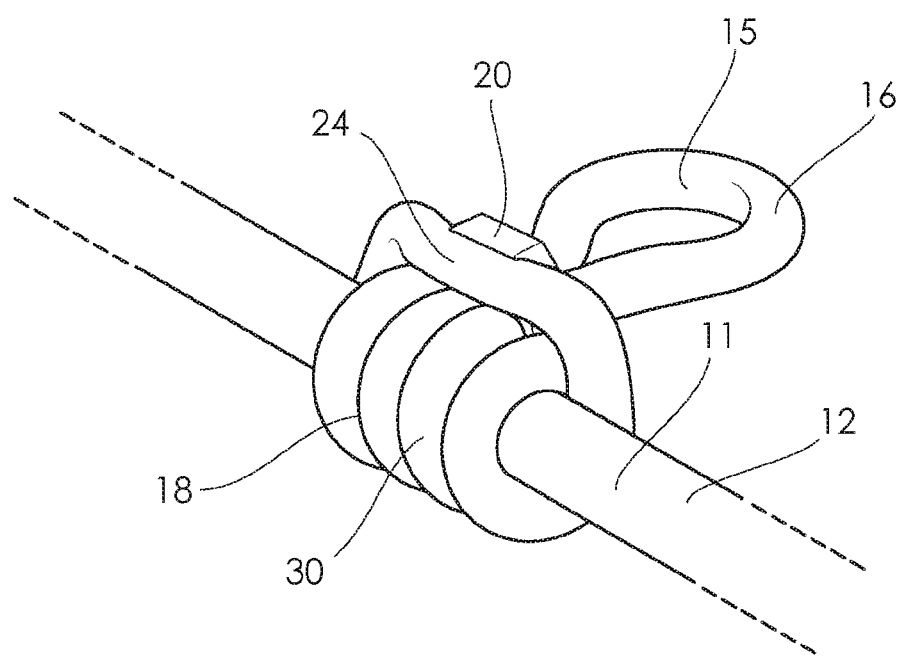
FIG. 9 is a perspective view illustrating the attachment device in a furled condition.

Referring to FIGS. 1 to 7 there is shown a first example of a device 10 for attachment with a structure 11 such as a rope 12, pole, bar, cord or the like. The device 10 includes a loop arrangement 14 having an attachment point 15 provided in this example by a first loop portion 16 and a second loop portion 18, and a retainer 20 located between and defining the first and second loop portions 16, 18. The first and second loop portions 16, 18 include respective first and second free ends 22, 24. The first loop portion 16 defines a first aperture 26, and the second loop portion 18 defines a second aperture 28.

It is noted the whilst the device 10 is described herein with reference to being attached with the rope 12, the device 10 may be attached to other structures such as bars, poles, gym equipment and tethers and is not limited to being used only with ropes. It is also noted that the attachment point 15 is described herein as preferably being in the form of a first loop portion 16. However, in other examples, the attachment point 15 may not include a loop and may include a short coupling section extending from the retainer 20 to which other items may be attached. The short coupling could even be a short bar having an aperture or pin.

The loop arrangement 14 is adapted to be movable between a non-furled condition, as shown in FIG. 1, in which the respective first and second ends 22, 24 of the first and second loop portions 16, 18 are located away from one another, and a furled condition, as shown in FIG. 2.

In the furled condition, the second loop portion 18 is wrapped around the rope 12 to form a wrapped section or gripping section 30 with the first loop portion 16 fitted through the second loop portion 18 and extends laterally of the rope 12 and with the second end 24 of the second loop portion 18 being retained by the retainer 20 thereby maintaining the furled condition.

The first loop portion 16 provides the attachment portion 15 to which other ropes, tethers, couplings, fittings, gym equipment or the like may be attached or coupled. In the furled condition, in this example, the second loop portion 18 is wrapped around the rope 12 and first loop portion 16 twice with each subsequent wrap being positioned laterally outwardly of the previous wrap in opposing lengthwise directions along the rope 12. It will be appreciated that in the furled condition the device 10 incorporates an improved prusik knot.

It is noted that whilst this example illustrates wrapping of the second loop portion 18 twice, the second loop portion 18 may in some examples be wrapped once, twice or three times of more around the rope 12, the first loop portion 16 and the retainer 20. The more wraps increase the width of the wrapped section 30 and hence the available friction gripping surface with the rope 12.

In more detail, in the first example, the loop arrangement 14 may be formed from a single piece of rope 13 (or other suitable material such a cord, rubber, other moulded plastics or the like) that is joined at junction 32 at the second free end 24. The join is located at the second free end 24 so as to be under minimal or reduced load in the furled condition. The junction 32 also fits with and is secured by the retainer 20. The junction 32 may be formed by sewing or gluing overlapping free end portions of a rope together as is shown in FIG. 1. The width of the junction 32 may be wider than the retainer 20.

In this example, the first loop portion 16 is relatively smaller in comparison to the second loop portion 18. However, the position of the retainer 20 may be varied to alter the relative size of the first and second loop portions 16, 18. The retainer 20 may be fixed, in which case the size of the loops 16, 18 are fixed, or the retainer 20 may be slidable on the loop arrangement 14 so as to provide adjustability. The size of the second portion 18, in particular, dictates the diameter of the wrapped section 30 through which the rope 12 is passed as well as the positioning of the second free end 24 relative to the retainer 20 in the furled condition. Visual indicator markings such as measurement lines (not shown) may be provided on the loop arrangement 14 that, in examples where the retainer 20 is moveable, the retainer 20 may be aligned with so that the wrapped section 30 defines a predetermined diameter to fit or work with a particular rope diameter.

The retainer 20, best shown in FIGS. 14 to 17, includes a coupling portion 34 for coupling with the loop arrangement 14 and a retaining portion 36 extending from the loop arrangement 14. The retaining portion 36 is adapted to at least partially receive the free end 24 of the second portion 18 in the furled condition. The retaining portion 36 includes a recess 38 provided in the form of a channel 40 that extends between opposing sides 42 of the retaining portion 34. The channel 40 may be curved or rounded so as to fit with the second loop portion 18 that may be correspondingly curved or rounded. The retainer 20 is used to limit the degree to which the device 10 can loosen on the primary rope or pole when load is removed.

The channel 40 is open at the opposing sides 42 and terminates at a lip 44 located at or toward a top 46 of the retaining portion 36. The recess 38 in the form of the channel 40 is oriented toward the second loop portion 18 in the unfurled condition and oriented away from the first loop portion 16 in the furled condition. The lip 44 extends away from the first loop portion 16 in the furled condition so as to provide a retaining hook over which the second end 24 of the second loop portion 18 is passed in the furled condition in which the second loop portion 18 is received by and extends along the channel 40.

The coupling portion 34 includes an aperture or passage 48 through which the loop arrangement 14 passes with two sections 50 (as shown in FIG. 3) of the loop arrangement 14 being captured side by side. The aperture 48 thereby having an elongate or oval like shape. The aperture 48 may be fixed to the loop arrangement 14 thereby fixing the sizes of the first and second loop portions 16, 18, or the aperture 48 may be dimensioned to slide relative to the loop arrangement 14 thereby allowing the sizing of the first and second loop portions 16, 18 to be varied. The fit between the aperture 48 and the loop arrangement 14 may be a light friction fit to allow the retainer 20 to be hand slidable.

Referring to FIGS. 19a to 19c and FIGS. 20a to 20e, there is shown a second example of the retainer 20 in which like numerals denote like parts. This second example of the retainer 20 is substantially similar to the first example shown in FIGS. 14 to 17, and all parts are not detailed again here. However, in this example, the aperture or passage 48 is an open channel 49 having an opening 51 defined by two generally inward facing c-shaped sides 49a, 49b extending along a bottom 53 of the coupling portion 34. The internal surfaces 55 of the open channel 49 include ribs 57 for gripping with the loop arrangement 14.

Figure 19A:
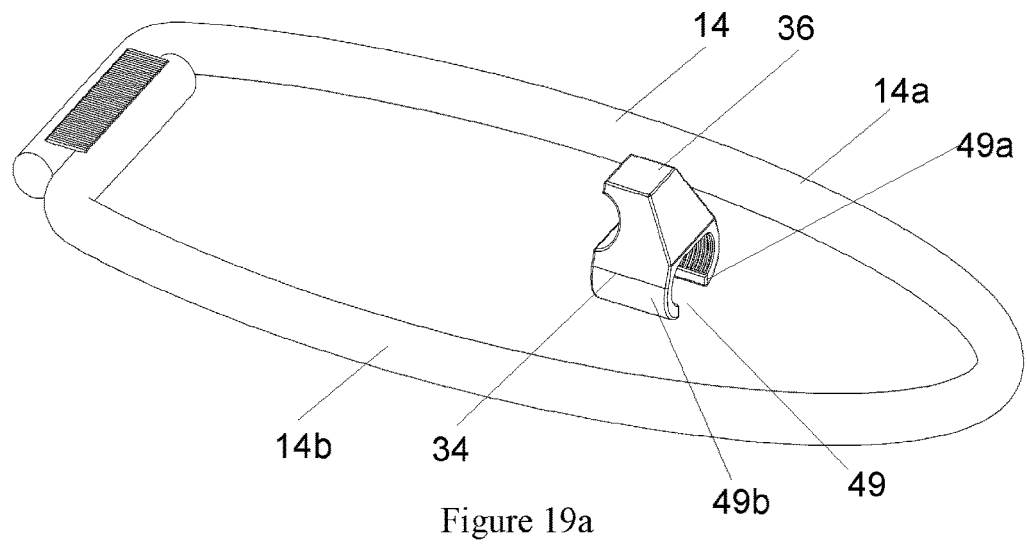
FIG. 19a is a perspective view illustrating the loop arrangement and a second example of the retainer.
Figure 19B:
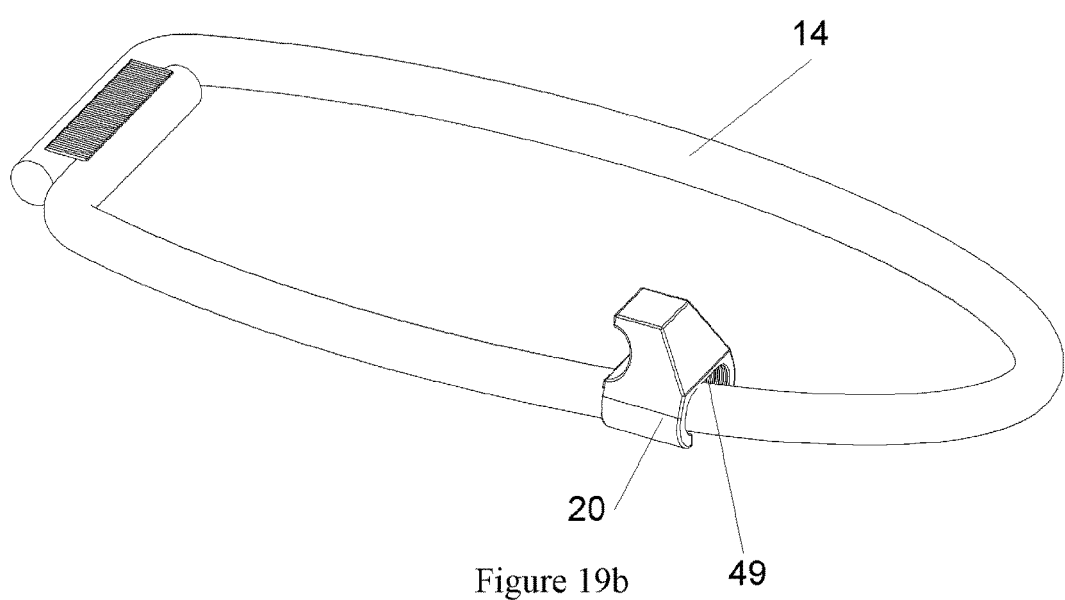
FIG. 19b is a perspective view illustrating the loop arrangement with the second example of the retainer partially fitted with one of the opposing sections received by an open channel of the retainer.
Figure 19C:
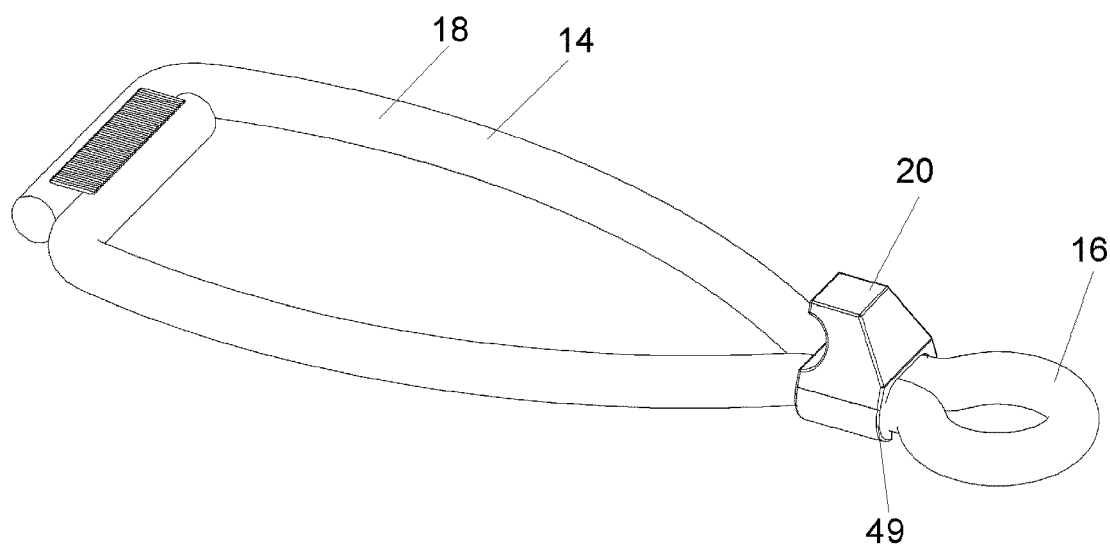
FIG. 19c is a perspective view illustrating arrangement with the second example of the retainer in a fitted condition with both of the opposing sections received by the open channel of the retainer.

The open channel 49 allows the loop arrangement 14 (which may initially be a simple loop of rope or rubber) to be fitted into the open channel 49 as shown in FIGS. 19a to 19c. Each side 49a and 49b of the open channel 49 receives and abuts with one of the sections 14a, 14b of the loop arrangement 14. Accordingly, one of the sections 14a is inserted before the other section 14b, as shown in FIG. 19b. When both sections 14a, 14b are fitted, as shown in FIG. 19c, the sections 14a, 14b are snuggly compressed together and retained by the open channel 49. The loop arrangement 14 is then formed with the first and second loop portions 16, 18 and the retainer 20 may be slid relative to the loop arrangement 14 to alter the relative sizes of the first and second loop portions 16, 18. The open channel 49 allows the retainer 20 to be fitted to any suitable looped rope, rubber or the like to form the device 10. Accordingly, the retainer 20 may be provided as a separate component allowing a user to provide their own loop of rope or the like for the loop arrangement 14. The retainer 20 may be formed from a plastic, metal or other suitable material.

Referring now to FIGS. 10 to 13, there is shown a second example of the device 10 and like numerals are used to denote like parts. This example is substantially similar to the first example and as all parts and features are not again described here. In this second example, the loop arrangement 14 may be formed from a single unitary piece of resilient material. Accordingly, this example does not require a junction or join as required in the first example that is preferably formed from rope. The remaining parts such as the first and second loop portions 16, 18 remain similar, and the retainer 20 may be fixed or slidable to alter the relative sizes of the first and second loop portions 16, 18. The channel 40 of the retaining portion 36 may be smaller as, in the absence of the junction, the second end 24 is relatively smaller in this second example.

The single unitary piece of resilient material, such as rubber, provides this second example with the ability to be easily pre-formed and retain its furled shape against the retainer 20 in the furled condition. More specifically, in the furled condition, the resilient material moves toward the initially unfurled condition that results in the second end 24 of the second loop portion 18 being urged against the retainer 20, specifically, the channel 40.

Accordingly, the retainer 20 holds the device 10 in the furled condition and the wrapped section 30 is maintained at a pre-determined diameter. The pre-determined diameter of the wrapped section 30 is typically arranged to be slightly larger than the rope diameter to which the device 10 is fitted to provide a slidable friction fit with the rope 12. This allows the device 10, when the first loop portion 16 is unloaded, to slide along the rope. The device 10 is also retained in the furled condition without unfurling.

The device 10 may also be pre-formed in the furled condition prior to being fitted to the rope 12. Again, the position of the retainer 20 determines the length of the second loop portion 18 and hence the diameter of the wrapped section 30 in the furled condition. Accordingly, the retainer 20 enables the wrapped section 30 to be formed to a pre-determined diameter. The loading of the first loop portion 16 tightens and constricts the wrapped section 30 to engage with the rope 12.

Figure 18A:
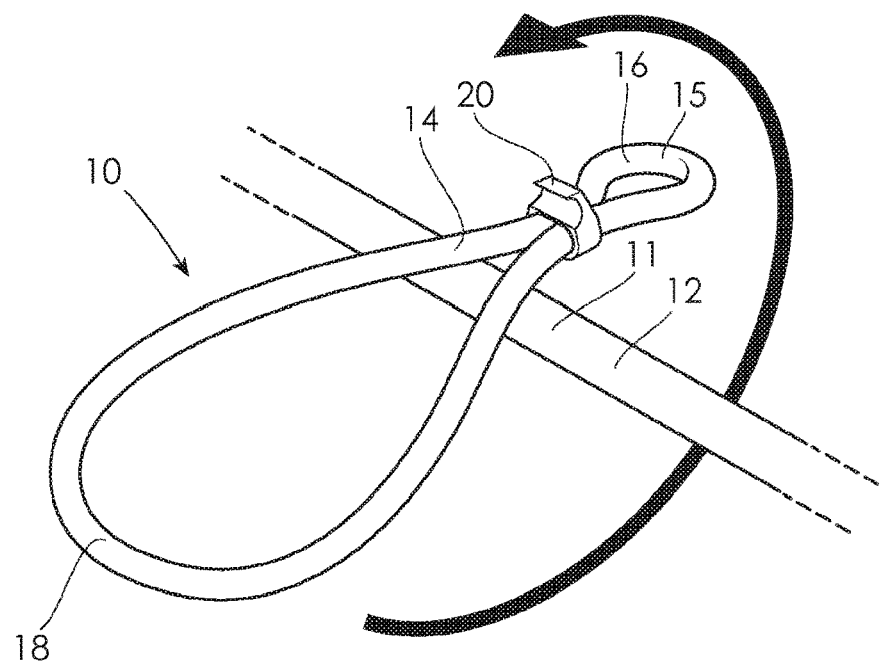
FIGS. 18a to 18c illustrate a sequence of coupling the device to a rope to form an attachment point.
Figure 18B:
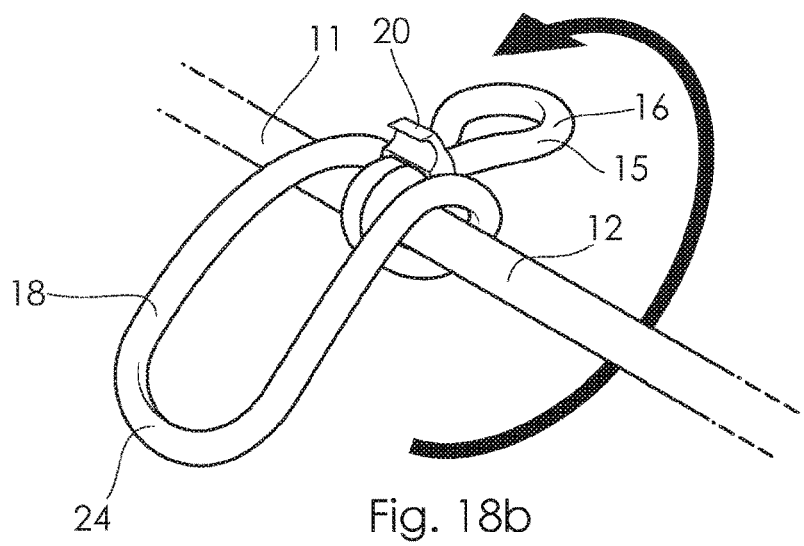
Figure 18C:
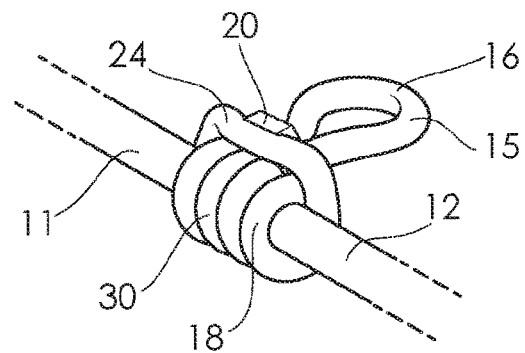

Referring now to FIGS. 18a to 18c there is shown an example sequence of steps to move the device 10 from an initially unfurled condition, as shown in FIG. 18a, to a furled condition, as shown in FIG. 18c. It is noted that in the Figures the rope 12 is illustrated. However, the device 10 may also be pre-formed into the furled condition in the absence of the rope 12 using the same method steps and then later fitting the device 10 to the rope. In this case, the device 10 is wrapped around an axis of where the rope will pass when the device 10 is eventually fitted to the rope.

A method of forming an attachment point for a rope 12, or similar structure like a pole, bar, cord, using the device 10 may be as follows. Firstly, if the device 10 has a moveable retainer 20, the retainer 20 may be actuated to alter the relative sizes of the first and second loop portions 16, 18. The loop portion 14 may have visible indicators to which the retainer 20 is aligned so that in the furled condition the wrapped section 30 has a pre-determined diameter to fit with a particular diameter rope. If the device 10 has a fixed retainer 20, this step may be omitted.

Next, as shown in FIG. 18a, the device 10 is positioned in an initially unfurled condition with the first loop portion 16 on one side of the rope 12 with the retaining portion 36 of the retainer 20 extending away from a side of the rope 12 and the second loop portion extending from a second side of the rope 12.

The second loop portion 18 is then furled around the rope 12, initially in a direction away from the retaining portion 16, and the first loop portion 16 is passed through and received by the second loop portion 18. The second loop portion 18 is wrapped twice around the rope 12, twice receives the first loop portion 16 and the retainer 20. The second loop portion 18 forms the wrapped section 30 with the first loop portion fitted through the second loop portion 18 and extending laterally of the rope 12 to provide the attachment point.

To secure the device 10 in the furled condition, the second end 24 of the second loop portion 18 is fitted with the retainer 20 thereby securing the device 10 in the furled condition. More specifically, the second end 24 is passed over the lip 44 and is received by the channel 40 so as to extend across the retaining portion 36. The wrapped section 30 is now at a pre-determined maximum diameter as determined by the position of the retainer 20. The attachment point 15, provided by the first loop portion 16, may then be tensioned relative to the rope 12 to tension and constrict the wrapped section 30 that grips the rope 12. The device 10 is then substantially immovably locked or secured to the rope 12 by the wrapped section 30. The attachment point 15 may then be loaded, and as the load increases the grip of the wrapped section 30 increases to keep the device 10 secured and fixed relative to the rope 12.

To move the device 10, load is removed from the attachment point 15 and the wrapped section 30 loosens on the rope 12. The retainer 20 is positioned so that when the second loop portion 18 is engaged with the retainer 20 in the furled condition, the wrapped section 30 has a diameter that allows the wrapped section 30 to slide, via a light hand moveable friction fit, along the rope 12 thereby allowing repositioning of the device 10 in the furled condition. It is noted that the light hand moveable friction fit is sufficient to maintain the position of the device 10 on the rope 12 when not being hand actuated. Once repositioned, the attachment point 15 is again loaded and the wrapped section 30 grips the rope 12.

It is noted that in the above example, the diameter of the rope or rubber of the loop portion is typically less than or equal to two thirds of the diameter of the primary structure 11 such as a rope or pole.

It is also noted that the method of using the device is substantially reverse to that used to form a classic prusik knot which typically involves wrapping an attachment loop portion around the rope and through a retaining loop portion thereof positioned close the rope. Whereas the present device and method enables the attachment loop to be maintained stationary at the rope, and the second loop portion is wrapped around the first loop portion until appropriately fitted over the retainer.

There has been described an advantageous device for providing an attachment point on a structure such as a rope, pole, bar, cord or the like. Advantages of examples of the device herein include: the device being is simpler to attach than a prusik loop, requiring minimal or no dressing, may never require redressing, the attachment portion is as close as possible to the primary rope or pole, the adjustable retainer enable a user to determine how loose the wrapped section becomes around the primary rope or pole when load is released, removed or supported. The device can be custom manufactured to include various attachment parts to be permanently attached to the attachment portion, including, but not limited to pulleys, carabeeners, hooks and metallic liners within the attachment portion to reduce friction.

Advantages specific the first rope example include that the rope version requires a smaller portion of the rope ends to be secured together to create the loop. This is because the connecting of the rope exists at the point where the least amount of tension reaches, near the retainer. Maximum tension exists at the attachment portion and diminishes through each loop till the join is reached.

Advantages specific the second rubber example include that the rubber version may be pre-moulded to the final shape and as such maintains the shape as if it is attached to the primary rope or pole even when it is removed from the rope. By maintaining the final shape, the rubber version offers the unique opportunity to feed the primary rope or role through the pre-formed wrapped section rather than having to furl the device around the primary rope or pole. The rubber version can incorporate a degree of flexibility introducing some give in height safety applications and maintaining of tension in load securing applications. The rubber version allows for different rubbers with different degrees of load capacities, fexibility, and friction.

The device may find application as part of, but not limited to, fitness equipment, climbing equipment, in height safety and load securing, and the transport industries.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any known matter or any prior publication is not, and should not be taken to be, an acknowledgment or admission or suggestion that the known matter or prior art publication forms part of the common general knowledge in the field to which this specification relates.

While specific examples of the invention have been described, it will be understood that the invention extends to alternative combinations of the features disclosed or evident from the disclosure provided herein.

Many and various modifications will be apparent to those skilled in the art without departing from the scope of the invention disclosed or evident from the disclosure provided herein.

The invention claimed is:

1. A device for attachment with a structure, the device including a loop arrangement having a first attachment portion and a second loop portion, and a retainer located between the first attachment portion and the second loop portion, wherein the loop arrangement is adapted to be movable between an unfurled condition and a furled condition, where in the unfurled condition, respective first and second ends of the first attachment portion and the second loop portion are located away from one another, wherein the retainer includes a coupling portion for coupling with the loop arrangement and a retaining portion extending from the coupling portion in a direction away from the section of the structure in the furled condition, the retaining portion including a channel extending between opposing sides of the retaining portion, the channel being shaped to fittingly receive with the second loop portion, and where in the furled condition, the second loop portion is wrapped around the structure to form a wrapped section with the first attachment portion fitted through the second loop portion and extending laterally of the structure and with the second end of the second loop portion passing over the retaining portion so as to be at least partially fittingly received by the channel in an orientation aligned with a section of the structure within the wrapped section and extending directly transversely across the wrapped section with the second end of the second loop portion captured between the channel and the wrapped section such that substantial unfurling is inhibited when the first attachment portion is unloaded and the second end of the second loop portion is substantially unrestricted to be urged against the wrapped section when a load is applied to the first attachment portion thereby allowing tightening of the second loop portion about the structure.

2. The device according to claim 1, wherein the retaining portion includes a projection oriented toward the second end of the second loop portion, the channel being defined between the projection and the coupling portion.

3. The device according to claim 1, wherein the retaining portion includes a lip toward its free end, the lip being oriented toward the second end of the second loop portion in at least the unfurled condition, and wherein the channel is defined between the lip and the coupling portion.

4. The device according to claim 1, wherein the channel is oriented toward the section of the structure in the furled condition.

5. The device according to claim 1, wherein the channel is elongate and arranged parallel to the section of the structure in the furled condition.

6. The device according to claim 1, wherein the coupling portion is moveable relative to the loop arrangement, movement of the coupling portion thereby changing the relative sizes of the first attachment portion and the second loop portion.

7. The device according to claim 1, wherein the coupling portion is fixed relative to the loop arrangement.

8. The device according to claim 1, wherein the coupling portion is arranged to capture opposing sections of the loop arrangement in a side by side orientation so as to define the first attachment portion and the second loop portion in a fitted condition.

9. The device according to claim 1, wherein the loop arrangement is provided in the form of a continuous loop.

10. The device according to claim 1, wherein the first attachment portion is provided in the form of a first loop portion.

* * * * *